(12) United States Patent  
Sanderovich et al.

(10) Patent No.: US 10,141,994 B2
(45) Date of Patent: Nov. 27, 2018

(54) TECHNIQUE FOR REDUCING RESPONDING SECTOR SWEEP TIME FOR MILLIMETER-WAVE DEVICES

(71) Applicant: QUALCOMM Incorporated, San Diego, CA (US)

(72) Inventors: Amichai Sanderovich, Atlit (IL); Mordechay Aharon, Pardes Hana Karcur (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/455,095

(22) Filed: Mar. 9, 2017

(65) Prior Publication Data
US 2017/0264350 A1 Sep. 14, 2017

Related U.S. Application Data

(60) Provisional application No. 62/306,629, filed on Mar. 10, 2016.

(51) Int. Cl.
*H04B 7/06* (2006.01)
*H04B 7/0491* (2017.01)
*H04B 7/08* (2006.01)

(52) U.S. Cl.
CPC .......... *H04B 7/0491* (2013.01); *H04B 7/0617* (2013.01); *H04B 7/0632* (2013.01); *H04B 7/0684* (2013.01); *H04B 7/0695* (2013.01); *H04B 7/088* (2013.01)

(58) Field of Classification Search
CPC .. H04B 7/0617; H04B 7/0408; H04B 7/0491; H04L 2025/03783
See application file for complete search history.

(56) References Cited

U.S. PATENT DOCUMENTS 9,219,576 B2 12/2015 Zhang et al.
2011/0069688 A1* 3/2011 Zhang .................. H04L 1/0083
370/338
(Continued)

FOREIGN PATENT DOCUMENTS

WO  WO-2012103381 A1  8/2012

OTHER PUBLICATIONS

International Search Report and Written Opinion—PCT/US2017/021771—ISA/EPO—May 15, 2017.
(Continued)

*Primary Examiner* — David S Huang
(74) *Attorney, Agent, or Firm* — Patterson & Sheridan, L.L.P.

(57) ABSTRACT

Certain aspects of the present disclosure provide techniques that may help reduce sector sweep time. In some cases, the techniques involve generating frames for transmission during a sector sweep procedure, each frame including an address field being determined based on at least one of a transmitter address of the apparatus or a receiver address of an intended recipient of the generated frames and having fewer bits than at least one of the transmitter address or the receiver address. In some cases, the techniques involve using different frame formats for initiator and responder frames transmitted during the sector sweep procedure.

22 Claims, 17 Drawing Sheets

(56) References Cited

U.S. PATENT DOCUMENTS

2014/0206304 A1 7/2014 Zhang et al.
2017/0134076 A1* 5/2017 Maamari .............. H04B 7/0452

OTHER PUBLICATIONS

"ISO/IEC/IEEE International Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2814 (Mar. 14, 2814), XP068878338, pp. 1-634.

Thomas N., et al., "IEEE 802.11ad: Directional 60 GHz corrmunication for multi-Gigabit-per-second Wi-Fi [Invited Paper]", IEEE Communications Magazine, IEEE Service Center, Piscataway, us. vol. 52. No. 12, Dec. 1, 2014 (Dec. 1, 2014), XP011567636, pp. 132-141.

* cited by examiner

| Frame Control | Duration | RA | TA | SSW | SSW Feedback | FCS |
|---|---|---|---|---|---|---|
| Octets: 2 | 2 | 6 | 6 | 3 | 3 | 4 |

|  | Original | Option1 | Option2 |
|---|---|---|---|
| Payload [Bytes] | 26 | 6 | 10 |
| Time [us] | 15.76 | 9.80 | 13.44 |
| Saving [%] | 0 | 37.83 | 14.76 |

FIG. 9

TECHNIQUE FOR REDUCING RESPONDING SECTOR SWEEP TIME FOR MILLIMETER-WAVE DEVICES

CLAIM OF PRIORITY UNDER 35 U.S.C. § 119

The present Application for Patent claims benefit of U.S. Provisional Patent Application Ser. No. 62/306,629, filed Mar. 10, 2016, assigned to the assignee hereof and hereby expressly incorporated by reference herein.

TECHNICAL FIELD

The present disclosure relates generally to wireless communications systems and, more particularly, a technique for reducing sector sweep time.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

The procedure to adapt the transmit and receive antennas, referred to as beamform training, may be performed initially to establish a link between devices and may also be performed periodically to maintain a quality link using the best transmit and receive beams.

Unfortunately, beamforming training represents a significant amount of overhead, as the training time reduces data throughput. The amount of training time increases as the number of transmit and receive antennas increase, resulting in more beams to evaluate during training.

SUMMARY

Certain aspects of the present disclosure provide an apparatus for wireless communications. The apparatus generally includes a first interface for obtaining first frames from a wireless node during a sector sweep procedure, a processing system configured to generate feedback regarding a transmit beamforming sector associated with one of the first frames, based on received signal qualities of the first frames as observed at the apparatus, and to generate second frames including the feedback, wherein the second frames have a different frame format than the first frames, and a second interface configured to output the second frames for transmission to the wireless node.

Certain aspects of the present disclosure provide an apparatus for wireless communications. The apparatus generally includes a processing system configured to generate first frames, a first interface configured to output the first frames for transmission to a wireless node during a sector sweep procedure, wherein each of the first frames is output for transmission using a different transmit beamforming sector, and a second interface configured to obtain, from the wireless node, second frames after outputting the first frames for transmission, wherein each second frame includes feedback regarding a transmit beamforming sector associated with one of the first frames and wherein the second frames have a different format than the first frames; wherein the processing system is further configured to determine a transmit beamforming sector based on the feedbacks and to communicate with the wireless via the determined beamforming transmit sector.

Certain aspects of the present disclosure also provide various other apparatus, methods, and computer readable medium for performing the operations described herein.

BRIEF DESCRIPTION OF THE DRAWINGS

FIG. 9 illustrates examples in a tabular representation, in accordance with certain aspects of the present disclosure, in accordance with certain aspects of the present disclosure.

DETAILED DESCRIPTION

Figure 1:
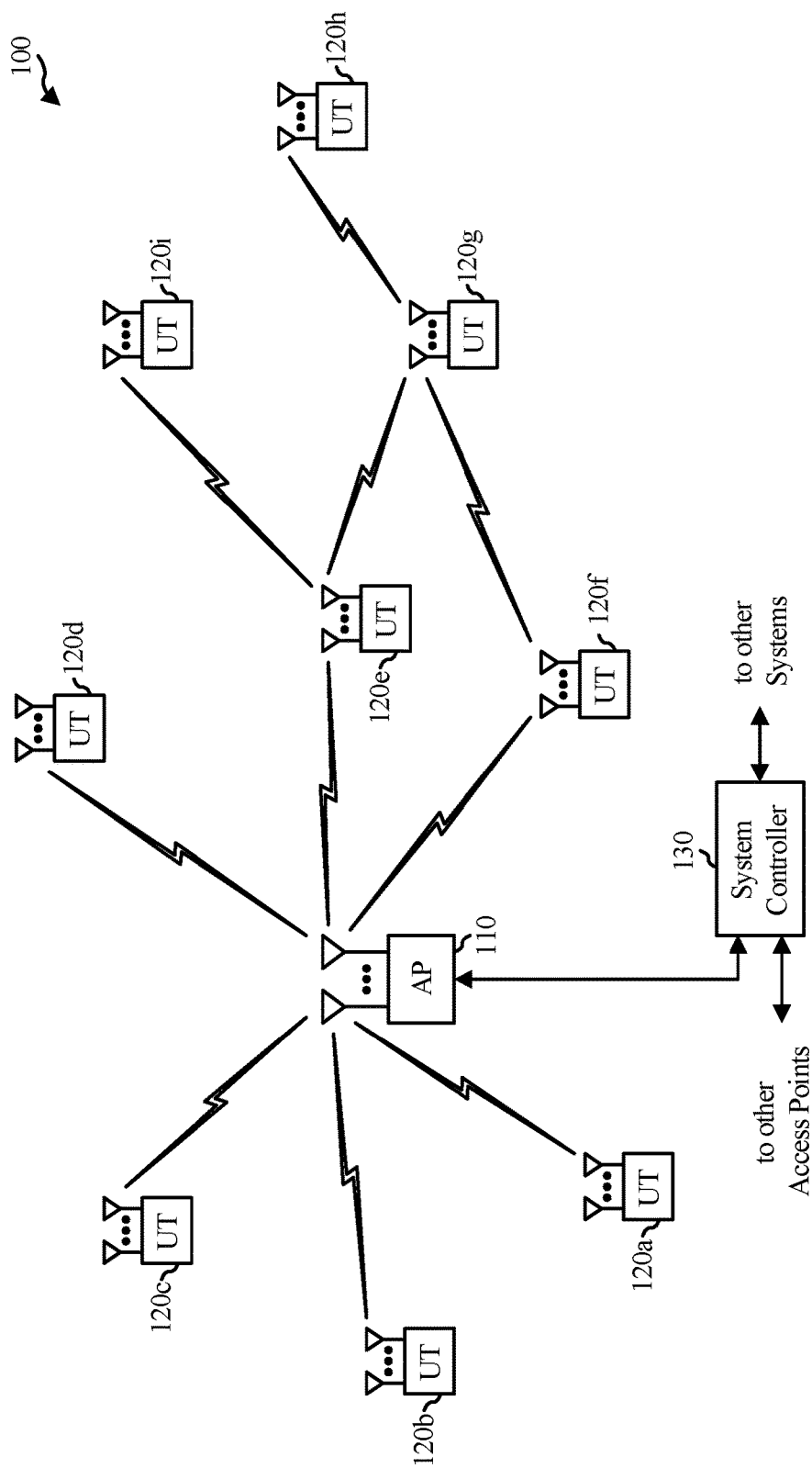
FIG. 1 illustrates a diagram of an example wireless communications network, in accordance with certain aspects of the present disclosure.

Aspects of the present disclosure may help reduce time during sector sweep procedures. By reducing the length of sector sweep frames, for example, by compressing or removing one or more fields, transmission time of each sector sweep frame may be reduced. As multiple sector sweep frames are typically transmitted in a sector sweep procedure, the reductions are compounded. Given that a station may perform a sector sweep procedure with several hundred stations, reducing transmission time of each frame by even micro-seconds, may result in an overall reduction of several milliseconds.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method of wireless communications may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may include an access point or an access terminal.

An access point ("AP") may include, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may include, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced.

For example, access point 110 or user terminals 120 may generate frames for transmission during a sector sweep procedure utilizing techniques described herein. In some cases, user terminals 120 may be game controllers or the like, and the techniques may be applied to generate frames for transmission during a sector sweep procedure of the game controllers to a game station (acting as an access point).

For simplicity, only one access point 110 is shown in FIG. 1. An access point 110 is generally a fixed station that communicates with the user terminals 120 and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point 110 to the user terminals 120, and the uplink (i.e., reverse link) is the communication link from the user terminals 120 to the access point 110. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point 110 may be configured to communicate with both SDMA and non-SDMA user terminals. This approach may conveniently allow older versions of user terminals ("legacy" stations) to remain deployed in an enterprise, extending the older versions of user terminals useful lifetime, while allowing newer SDMA user terminals to be introduced as deemed appropriate.

The MIMO system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point 110. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The MIMO system 100 may also be a TDMA system if the user terminals 120 share the same frequency channel by dividing transmission/reception into different time slots, each time slot being assigned to different user terminal 120.

Figure 2:
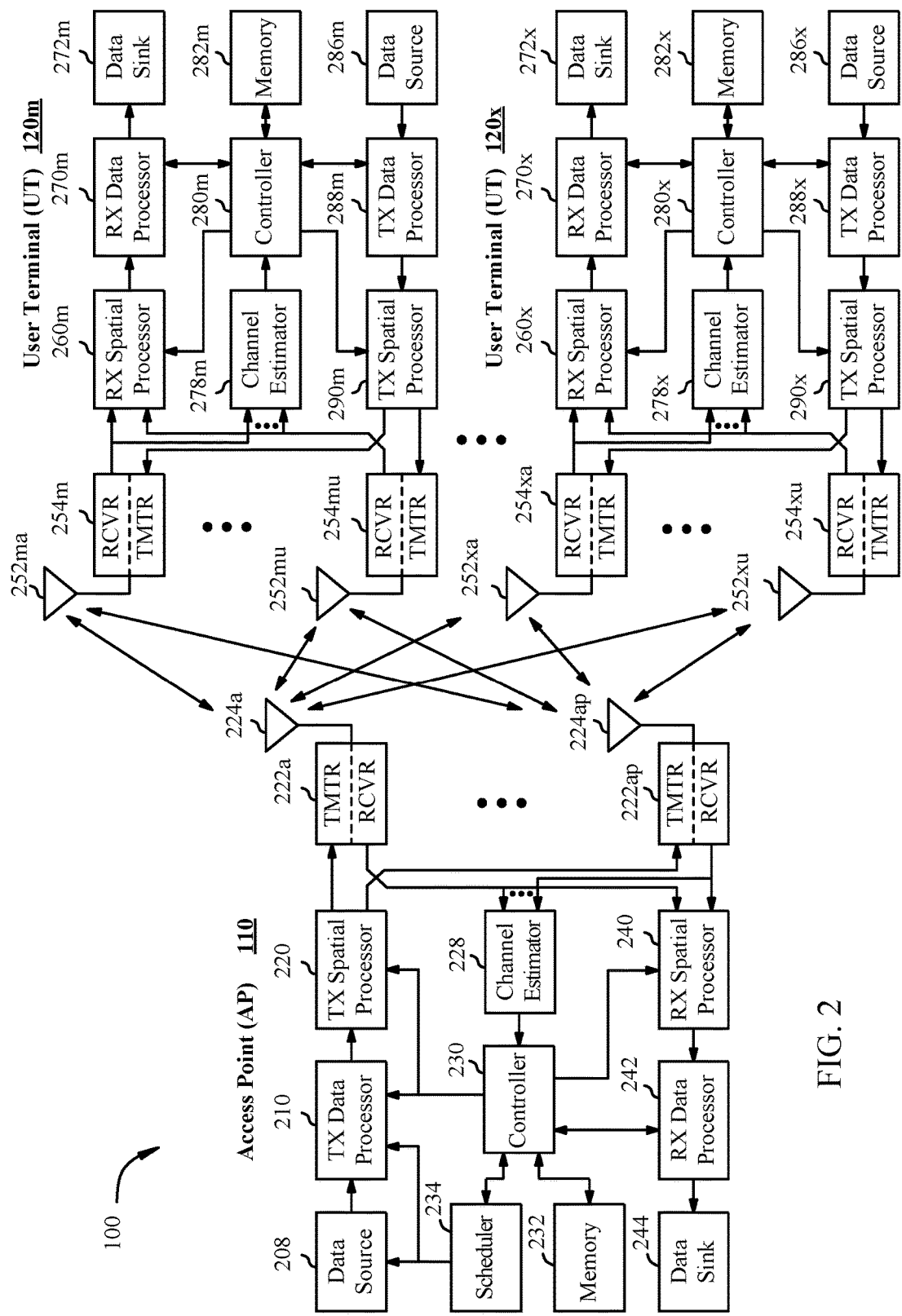
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100 in which aspects of the present disclosure may be practiced. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point 110 and user terminal 120.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of a transceiver 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point 110.

Nup user terminals may be scheduled for simultaneous transmission on the uplink. Each of these user terminals performs spatial processing on its data symbol stream and transmits its set of transmit symbol streams on the uplink to the access point 110.

At access point 110, $N_{ap}$ antennas 224a through 224ap receive the uplink signals from all Nup user terminals transmitting on the uplink. Each antenna 224 provides a received signal to a respective receiver unit (RCVR) of a transceiver 222. Each receiver unit of a transceiver 222 performs processing complementary to that performed by transmitter unit of a transceiver 254 and provides a received symbol stream. An RX spatial processor 240 performs receiver spatial processing on the $N_{ap}$ received symbol streams from $N_{ap}$ receiver units of transceivers 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit of a transceiver 222 receives and processes a respective transmit symbol stream to generate a downlink signal. $N_{ap}$ transmitter units of transceivers 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit of a transceiver 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix Hdn,m for that user terminal. Controller 230 derives the spatial filter matrix for the access point 110 based on the effective uplink channel response matrix Hup,eff. Controller 280 for each user terminal may send feedback information (e.g., the downlink and/or uplink eigenvectors, eigenvalues, SNR estimates, and so on) to the access point 110. Controllers 230 and 280 also control the operation of various processing units at access point 110 and user terminal 120, respectively.

According to certain aspects of the present disclosure, the various processors shown in FIG. 2 may direct the operation at an access point 110 and/or user terminal 120, respectively, to perform various techniques described herein.

Figure 3:
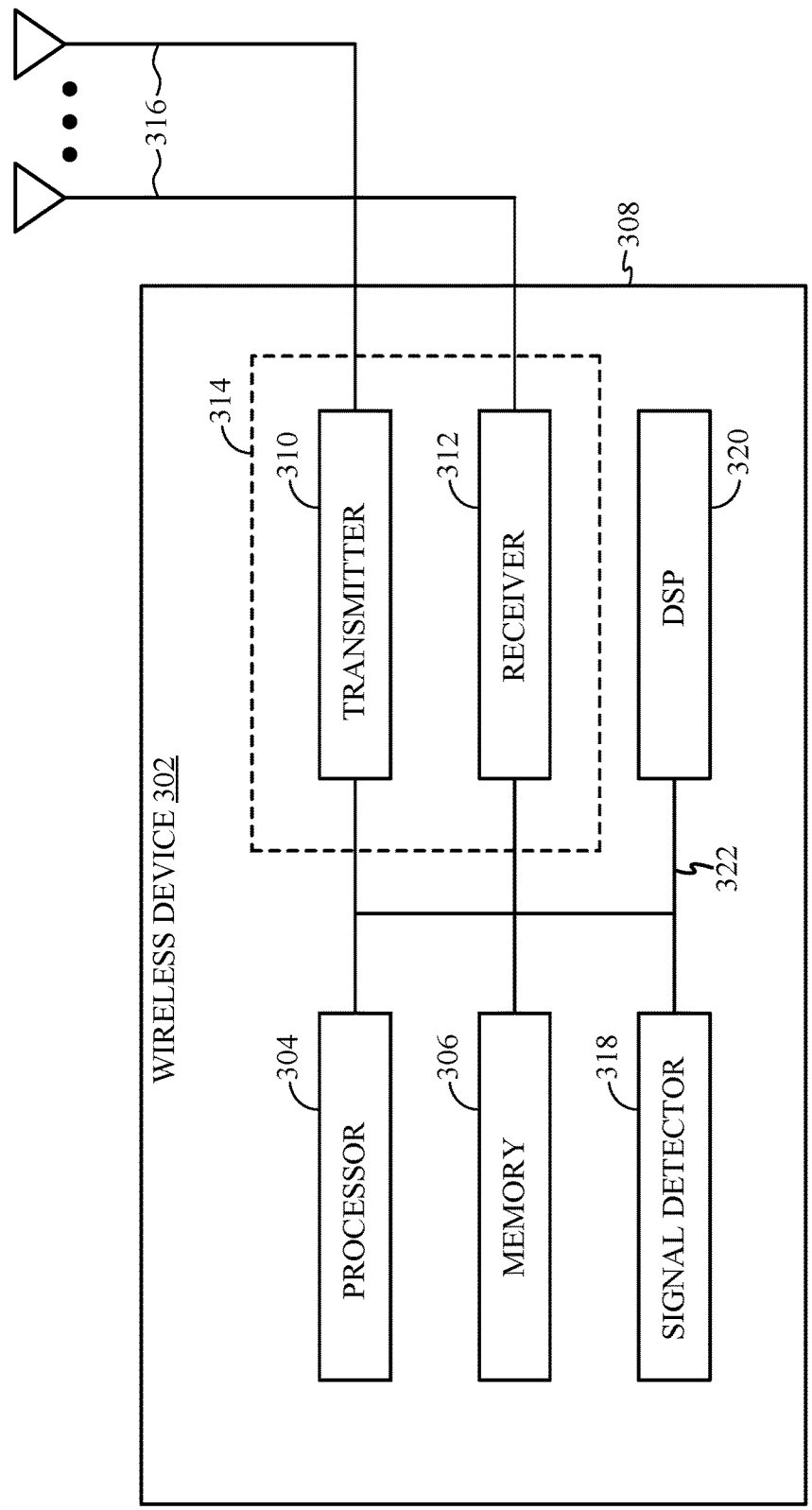
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to generate frames for transmission during a sector sweep procedure and/or other processes for the techniques described herein and/or may perform or direct operations 700 in FIG. 7 to process such frames during a sector sweep procedure.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In high frequency (e.g., mmWave) communication systems like 60 GHz (e.g., 802.11ad version and 802.11ay version of the 802.11 family of IEEE standards), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication. The procedure to adapt the transmit and receive antennas, referred to as beamforming training, may be performed initially to establish a link between devices and may also be performed periodically to maintain a quality link using the best transmit and receive beams According to an exemplary embodiment, a BF training process includes a sector level sweep (SLS) phase and a beam refinement stage. In the SLS phase, one of the STAs acts as an initiator by conducting an initiator sector sweep, which is followed by a transmit sector sweep by the responding station (where the responding station conducts a responder sector sweep). A sector generally refers to either a transmit antenna pattern (configuration) or a receive antenna pattern (configuration) corresponding to a sector ID. As mentioned above, a station may be a transceiver that includes one or more active antennas in an antenna array (e.g., a phased antenna array).

The SLS phase typically concludes after an initiating station receives sector sweep feedback (feedbacks) and sends a sector acknowledgement (ACK), thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multigigabit (DMG) beacon frames via different sectors, in which a sweep is performed between consecutive transmissions.

During the beam refinement phase, each station can sweep a sequence of transmissions, separated by a short beamforming interframe space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Example Beamforming Training Procedure

Figure 4:
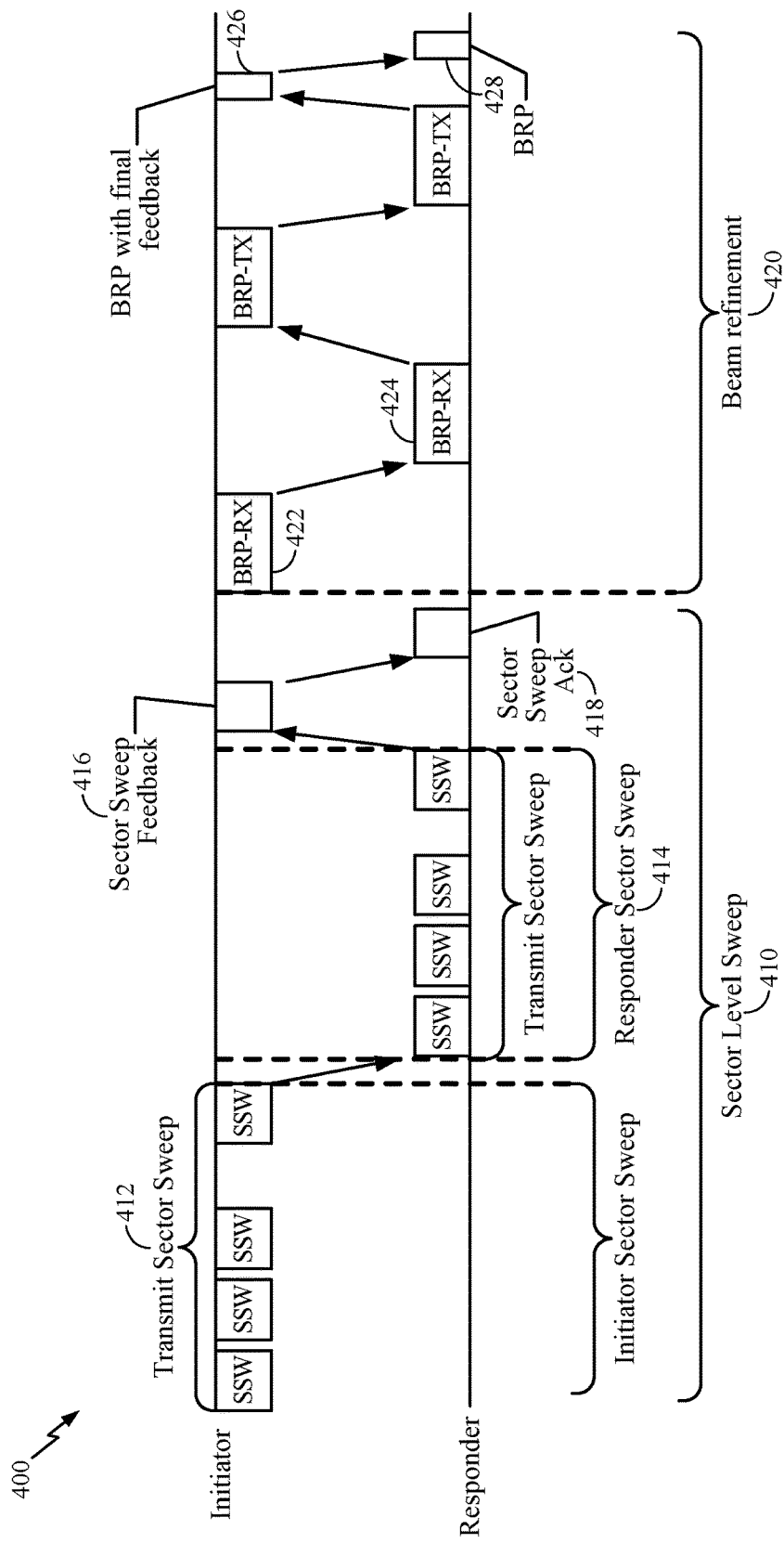
FIG. 4 illustrates an example beamforming training procedure that may utilize frame formats in accordance with certain aspects of the present disclosure.

FIG. 4 illustrate an example of a BF training procedure between stations (STA1 and STA2 in this example) that uses a sector sweep followed by a beam refining phase (BRP) in line with the description above. For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

As illustrated in FIG. 4, in all cases where the AP has large number of elements, the sectors used are relatively narrow, causing the SLS (Sector Level Sweep) process to be long. The higher the directivity more sectors are needed and therefore the SLS is longer. As an example, an AP with an array of 100 antenna elements may use 100 sectors. This situation is not desired since SLS is an overhead affecting throughput, power consumption and induces a gap in the transport flow.

Figures 5, 5A:
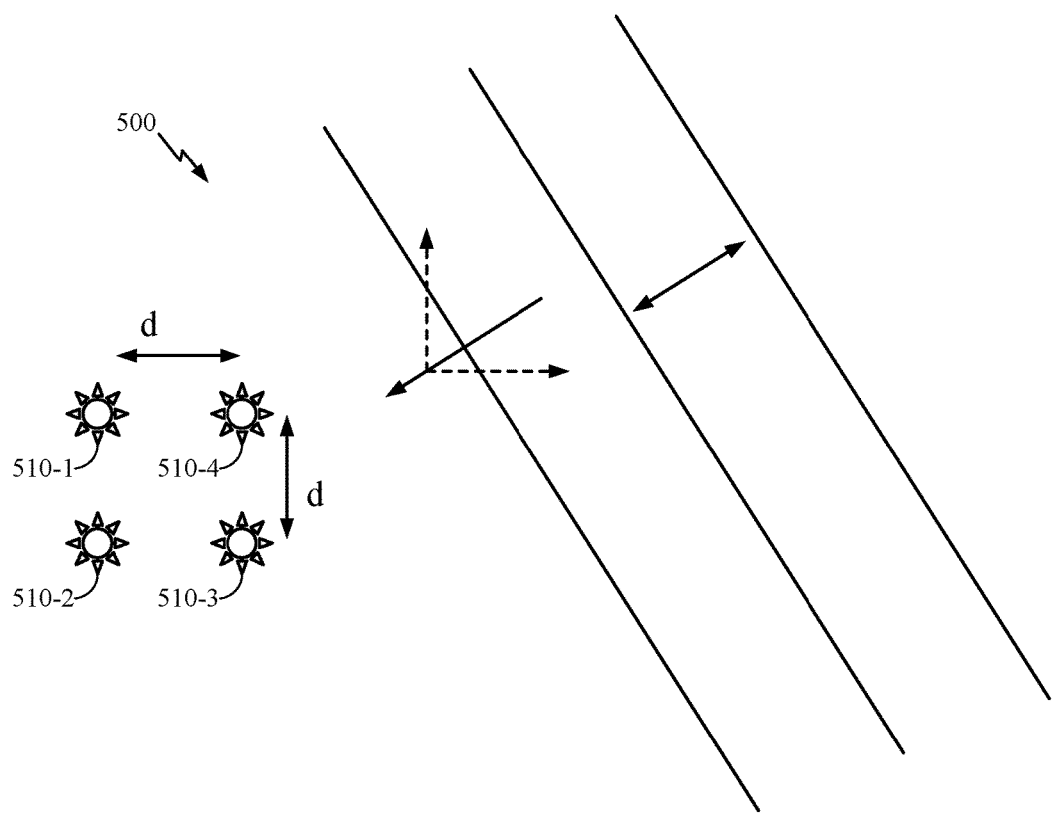
FIG. 5 is a diagram illustrating signal propagation in an implementation of phased-array antennas.
FIG. 5A illustrates a conventional sector sweep frame format.

FIG. 5 is a diagram illustrating signal propagation 500 in an implementation of phased-array antennas. Phased array antennas use identical elements 510-1 through 510-4 (hereinafter referred to individually as an element 510 or collectively as elements 510). The direction in which the signal is propagated yields approximately identical gain for each element 510, while the phases of the elements 510 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This may be accomplished with a phased array that may be able to handle rotation of the electrical field by using antennas or antenna feeds that match a certain polarity and that may be capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

As noted above, a sector sweep procedure may be performed as part of an overall beamforming (BF) training process according to, for example, the IEEE 802.11ad standard, that also involves a subsequent beamforming refinement protocol (BRP). The BF training process is typically employed by a pair of millimeter-wave stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link may be established with optimal receive and/or transmit antenna settings.

Example Reduction of Sector Sweep Time

As noted above, aspects of the present disclosure may help reduce time during sector sweep procedures. By utilizing a compressed frame format for sector sweep frames (e.g., by compressing or removing one or more bits from one or more fields or removing one or more frames entirely) the transmission time of each sector sweep frame may be reduced. The techniques may be applied to any types of devices taking part in beamforming training involving a sector sweep, such as game controller, mobile phones, or the like.

FIG. 5A illustrates a conventional sector sweep (SSW) frame format that may be used in a sector sweep procedure. As will be described in greater detail below with reference to FIGS. 8A and 8B, a compressed frame format may be generated by compressing one or more of the fields illustrated in FIG. 5A (e.g., such that fewer bits are used to convey the same information) or by removing one or more of the fields entirely.

Figure 6:
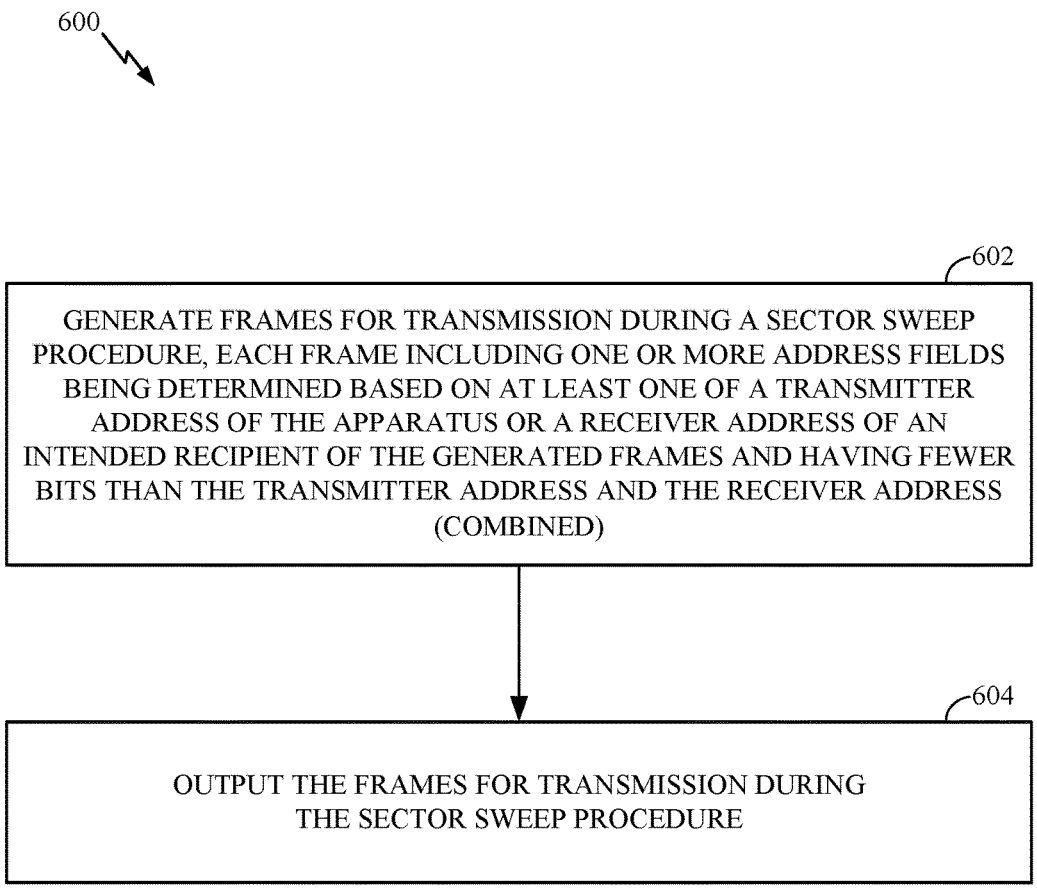
FIG. 6 illustrates example operations that may be performed by an apparatus for generating frames during a sector sweep procedure, in accordance with certain aspects of the present disclosure.
Figure 6A:
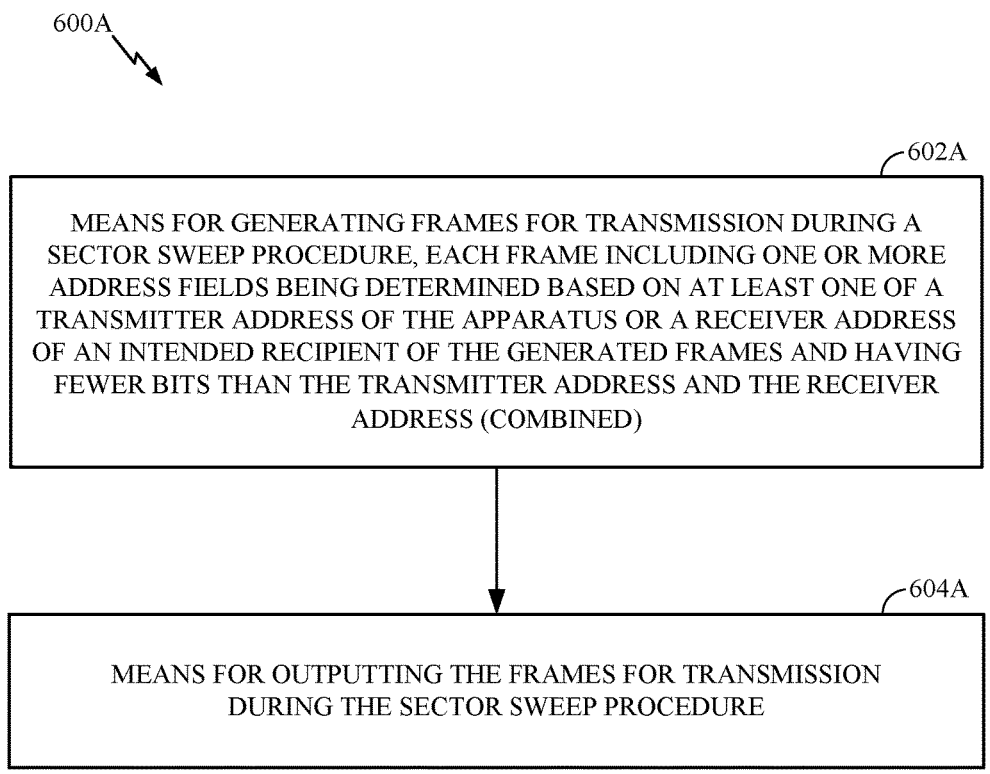
FIG. 6A illustrates components capable of performing the operations shown in FIG. 6, in accordance with certain aspects of the present disclosure.

FIG. 6 illustrates example operations 600 that may be performed by an apparatus for generating sector sweep frames using a compressed frame format during a sector sweep procedure, in accordance with certain aspects of the present disclosure.

The operations 600 begin, at 602, by generating frames for transmission during a sector sweep procedure, each frame including one or more address fields being determined based on at least one of a transmitter address of the apparatus or a receiver address (combined) of an intended recipient of the generated frames and having fewer bits than the transmitter and the receiver addresses. For example, the address fields may be generated using a hash function applied to both the transmitter and receiver addresses (with the transmitter and receiver addresses as input) and the resulting value output may have fewer bits than the transmitter and receiver addresses combined or, in some cases, fewer bits than either the transmitter address or the receiver addresses. At 604, the apparatus outputs the frames for transmission during the sector sweep procedure.

Figure 7:
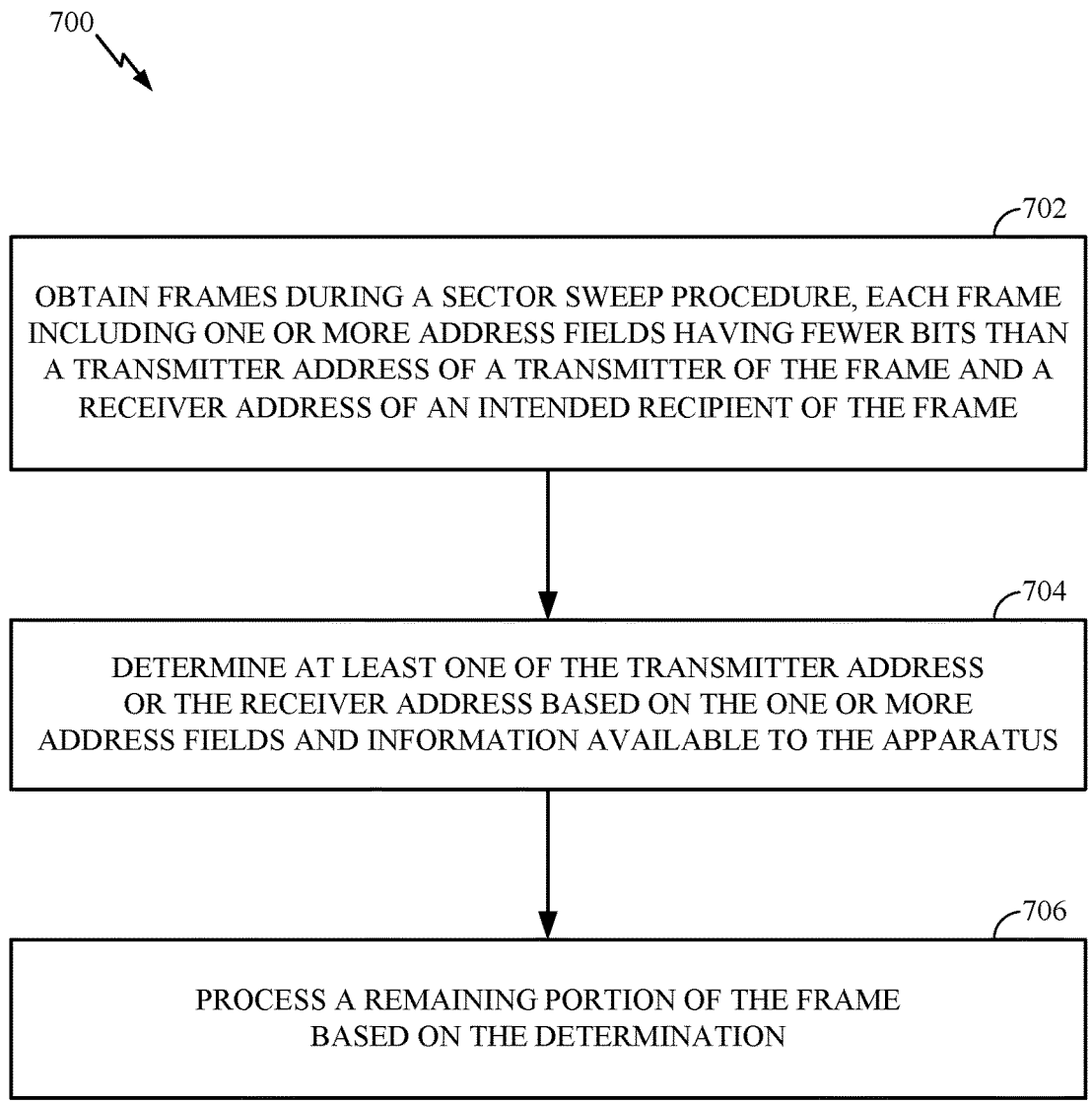
FIG. 7 illustrates example operation that may be performed by an apparatus for receiving frames during a sector sweep procedure, in accordance with certain aspects of the present disclosure.
Figure 7A:
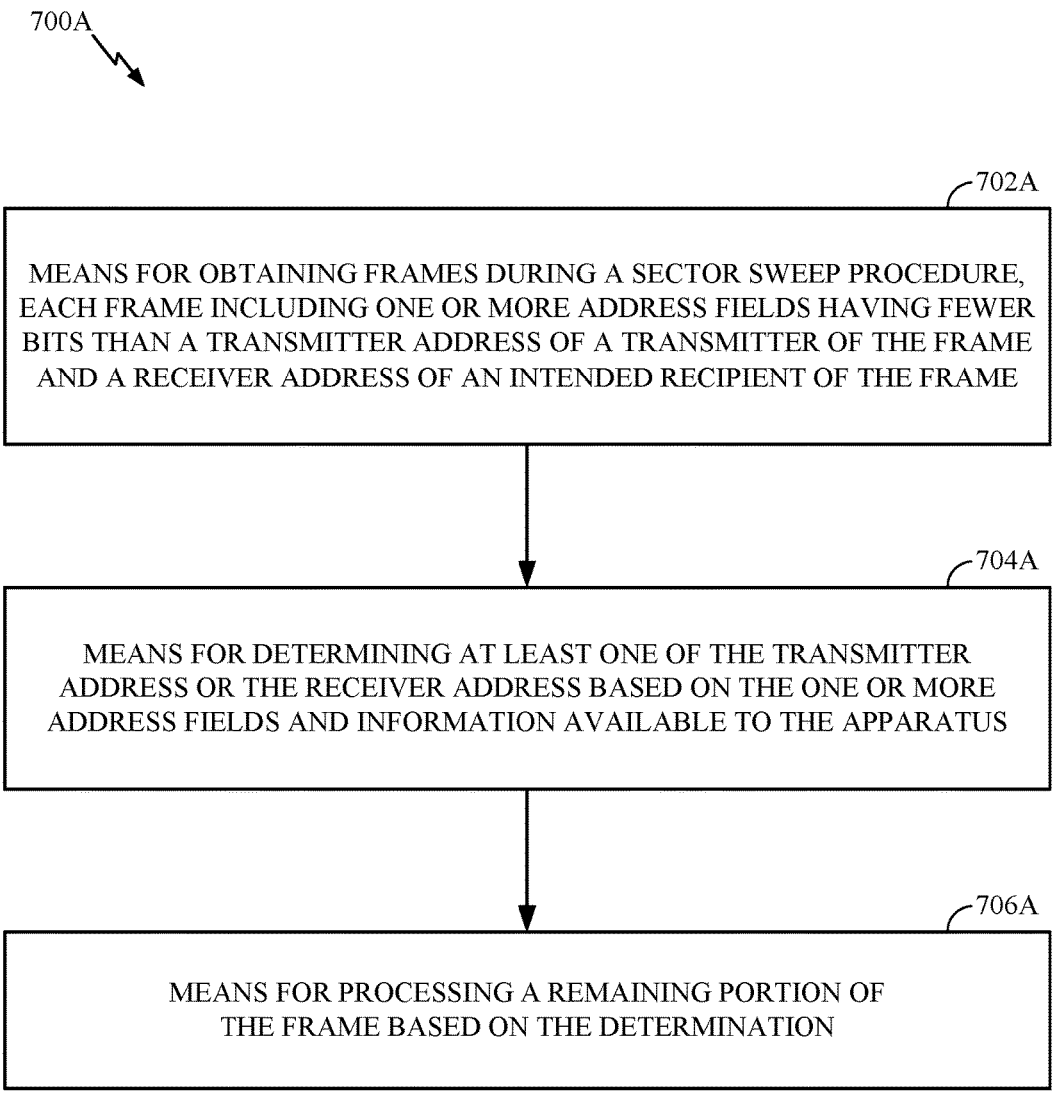
FIG. 7A illustrates components capable of performing the operations shown in FIG. 7, in accordance with certain aspects of the present disclosure.

FIG. 7 illustrates example operations 700 that may be performed by an apparatus for processing compressed sectors sweep frames during a sector sweep procedure, in accordance with certain aspects of the present disclosure. In other words, operations 700 may correspond to complementary operations performed by a station that is participating in beamforming training with a station generating compressed sector sweep frames according to operations 600 described above.

The operations 700 begin, at 702, by obtaining frames during a sector sweep procedure, each frame including one or more address fields having fewer bits than a transmitter address of a transmitter of the frame and a receiver address (combined) of an intended recipient of the frame. At 704, the apparatus determines at least one of the transmitter address or the receiver address based on the address field and additional information. At 706, the apparatus processes a remaining portion of the frame based on the determination.

The additional information (which may be considered "side" information as the additional information is not included in the frame), for example, may be one or more actual address stored in the receiver. In such cases, the compression (applied when generating the frame) may set the value of the address field to select between the stored addresses. A receiving device may check that the receiver address indicated by the value of the address field matches its own (to verify the receiving device is the intended recipient). In some cases, the additional information may indicate a hash value used to generate the value of the address field based on the transmitter and receiver addresses. In this manner, the receiving device may be able to determine what transmitter and receiver addresses (when the hash function was applied) would have resulted in the value received in the address field. In some cases, additional information may be provided to the receiving device (by a transmitting device), for example, during an association procedure.

In some cases a compressed frame format may include an address field determined based on at least one of a transmitter address of the apparatus or a receiver address of an intended recipient of the generated (e.g., by applying a hash function). A receiving device may confirm (or at least help in confirming) it is the intended recipient of the frame based on the address field. The amount of compression achieved in this manner may vary. For example, as shown in FIGS. 8A and 8B, a transmitter address (TA) field and receiver address (RA) field, 6 bytes each, may be combined to form a single field with a length of one byte or less.

Figure 8A:
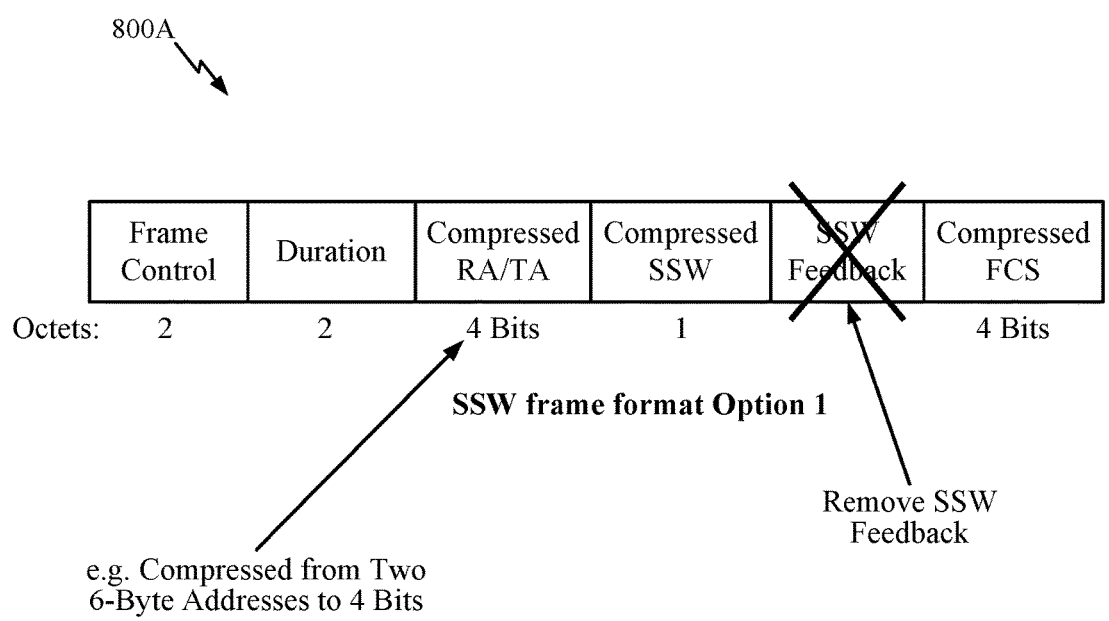
FIG. 8A illustrates an example of a sector sweep frame format, in accordance with certain aspects of the present disclosure.
Figure 8B:
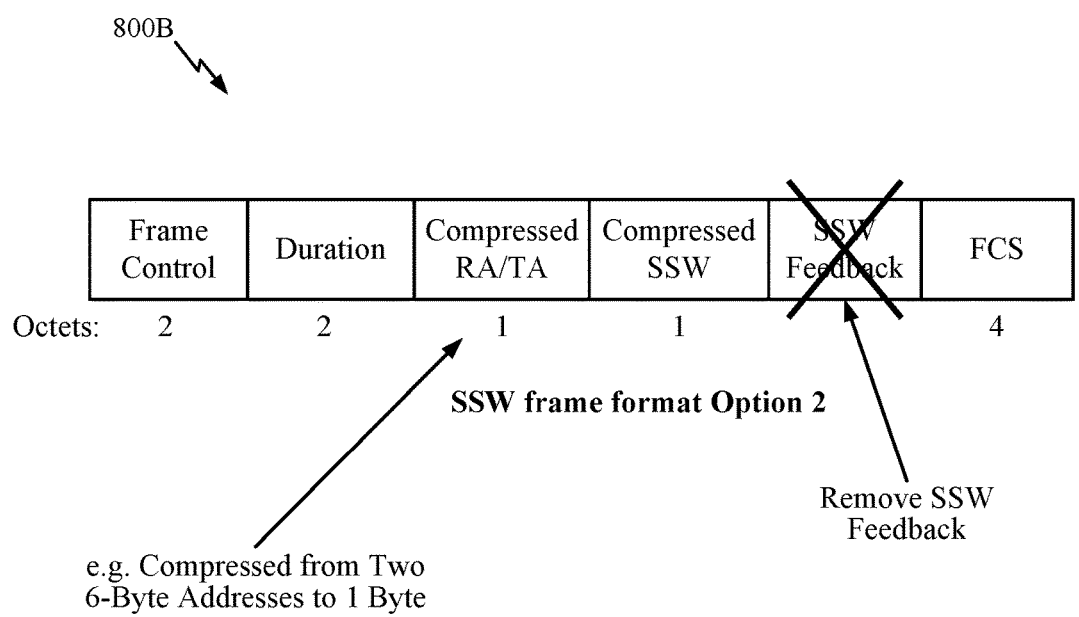
FIG. 8B illustrates another example sector sweep frame format, in accordance with certain aspects of the present disclosure.

FIG. 8A illustrates an example compressed sector sweep frame format (referred to herein as Option one), in accordance with certain aspects of the present disclosure. This example of a compressed sector sweep frame format may yield a reduction of 20 Bytes in frame length (and corresponding reduction in sector sweep time). Part of the time reduction may be obtained by using a hash function, for example, a 6-byte receiver address (RA) and a 6-byte transmission address (TA), or a total of 96-bit of addresses, may be compressed to a half byte, or 4 bits.

The sector sweep frame format example of FIG. 8A further illustrates that a 4-byte frame check sequence (FCS) field may be shortened to 4 bits. Generally, the frame check sequence (FCS) may be implemented for protecting data payload during the propagation of the payload to higher layers. However, because errors in the sector sweep frame do not propagate to higher layers, lower protection can be adequately provided.

In some cases, a 3-byte sector sweep feedback may be removed in some cases because the sector sweep feedback may only be needed in a responder sweep. In some cases, a sector sweep frame can include a sector sweep field that indicates both a sector ID value and a sector sweep countdown value, and the sector sweep ID may equal to the sector sweep countdown number. In such cases, no additional signaling for more antennas/RXSS length/Direction may be needed. As the sector sweep ID and countdown value are typically carried in a sector sweep (SSW) field, the SSW frame length may be further reduced, for example, by compressing the SSW field from 3 bytes to 1 byte or 9 bits (e.g., by using a single sector sweep field for both sector sweep ID and sector sweep countdown). In some cases, a sector sweep frame may include a value indicating the address field is compressed (e.g., a frame format type with a value indicating an address field has fewer bits than a transmitter address and a receiver address; e.g., based on a value of a frame format type, a compressed address field may be identified and processed based on the identification). In some cases, sector sweep frames may be discarded (e.g., a receiver or transmitter address determined from an address field of the frame does not match any addresses of the receiver or transmitter; e.g., a generated FCS does not match the FCS included in a frame).

FIG. 8B illustrates another example of compressed sector sweep frame format (referred to herein as Option two), in accordance with certain aspects of the present disclosure. The sector sweep frame format example may result in a 16-byte reduction in length (and corresponding reduction from sector sweep time). In this example, the two 6-byte RA/TA addresses may be compressed to a single byte (compared to the half byte shown in FIG. 8A). In this example, the FCS may be the same as conventional frame shown in FIG. 5A, but the sector sweep feedback can be removed and the SSW field may still be compressed (in other words, a sector sweep frame may lack a sector sweep feedback field).

FIG. 8C illustrates another example of compressed sector sweep frame format (referred to herein as Option three), in accordance with certain aspects of the present disclosure. In this example, the RA/TA addresses may be compressed from two 6-byte fields (96 bits total) to a single 2.5-byte field (20 bits), for example, using a 100 bit to 20 bit hash function. For associated STAs, the uncompressed RA and TA addresses will be known, so the recipient can apply the hash function to the known addresses to see if the results match the value of the compressed RA/TA address field.

In some cases, the compressed RA and TA field may also be based on a scrambler seed or a PHY header CRC of the SSW frame. The scrambler seed may be different per SSW procedure or per SSW frame. Dependency on the scrambler seed in this manner may help ensure that a STA that incorrectly detected its own RA after uncompressing the compressed TA/RA field will not repeat this false detection. Of course, reducing the amount of compression (e.g., using more bits for the output of the hash function) may further reduce the chances for a false RA match.

As illustrated, the FCS field may also be compressed, for example, from 4 bytes to half a byte (4 bits), which may have a relatively low impact on false positives. The duration field and sector sweep feedback field may also be removed (so the SSW frame lacks these fields). Accordingly, in one or more cases, a second frame lacks a duration field. In some cases, the duration field may be compressed by either quantization to lower resolution (e.g., greater than 1 us so fewer bits may be used to indicate a given duration) or use a same resolution with a shorter length (meaning a shorter maximum duration can be indicated), for example, taking the countdown ID into consideration.

As illustrated, the SSW field may also be compressed (e.g., from 3 bytes to 1.5 bytes). This SSW compression may be achieved, for example, by using a 12 bit countdown field, with 10 bits for sectors and 2 bits for antennas (or some other similar type bit allocation).

FIG. 9 illustrates example reductions of sector sweep time that may be accomplished using the frame formats shown in FIGS. 8A and 8B, relative to the conventional frame format shown in FIG. 5A.

As illustrated, by utilizing Option one illustrated in FIG. 8A, reductions of up to 37% may be achieved, while utilizing Option two illustrated in FIG. 8B, may yield reductions of up to 15%. The exact yield achieved may represent a tradeoff between reductions in transmission time and an increase probability of undetected errors. Further, the reduction in sector sweep time may be orthogonal (e.g., independent of) to other methods that reduce the sector sweep time.

Because there can be hundreds of sectors that may be swept during a sector sweep procedure, the accumulative time reduction in sector sweep time using the compressed frame formats described herein during a sector sweep procedure can be significant. For example, a device with a relatively large antenna array may use additional sectors for training, and an access point (AP) with 256 antennas that use 256 sectors may spend 4 ms for sector sweep. Thus, the aggregate sector sweep time for training of 10 STAs can be greater than 40 ms. Therefore, utilizing the compressed frame formats described herein to reduce transmission time of each frame may result in significant performance improvements.

Example Reduction of Response Sector Sweep Time

Aspects of the present disclosure may also help reduce time during sector sweep procedures by utilizing a compressed frame format for response sector sweep frames carrying sector sweep feedback (indicating a direction corresponding to a best observed receive quality). Such a response sector sweep frame may be sent, for example, in response to an initiator sector sweep frame having a compressed frame format, such as shown in FIG. 8A or 8B. In any case, by compressing or removing one or more bits from one or more fields (or removing one or more fields entirely) the transmission time of each response sector sweep frame may be reduced.

In some cases different formats may be used for responder and initiator SSW frames, which may help minimize the responding sector sweep duration. As will be described below, with reference to FIGS. 12A-12C, in some cases, responder SSW frames may have a (further) compressed format. Compressing various fields of the frame may still allow for SSW feedback in a shorter frame (e.g., only 6 bytes in length). The SSW feedback may indicate directional information (e.g., a best sector and antenna ID) from a previous sector sweep.

Figure 10:
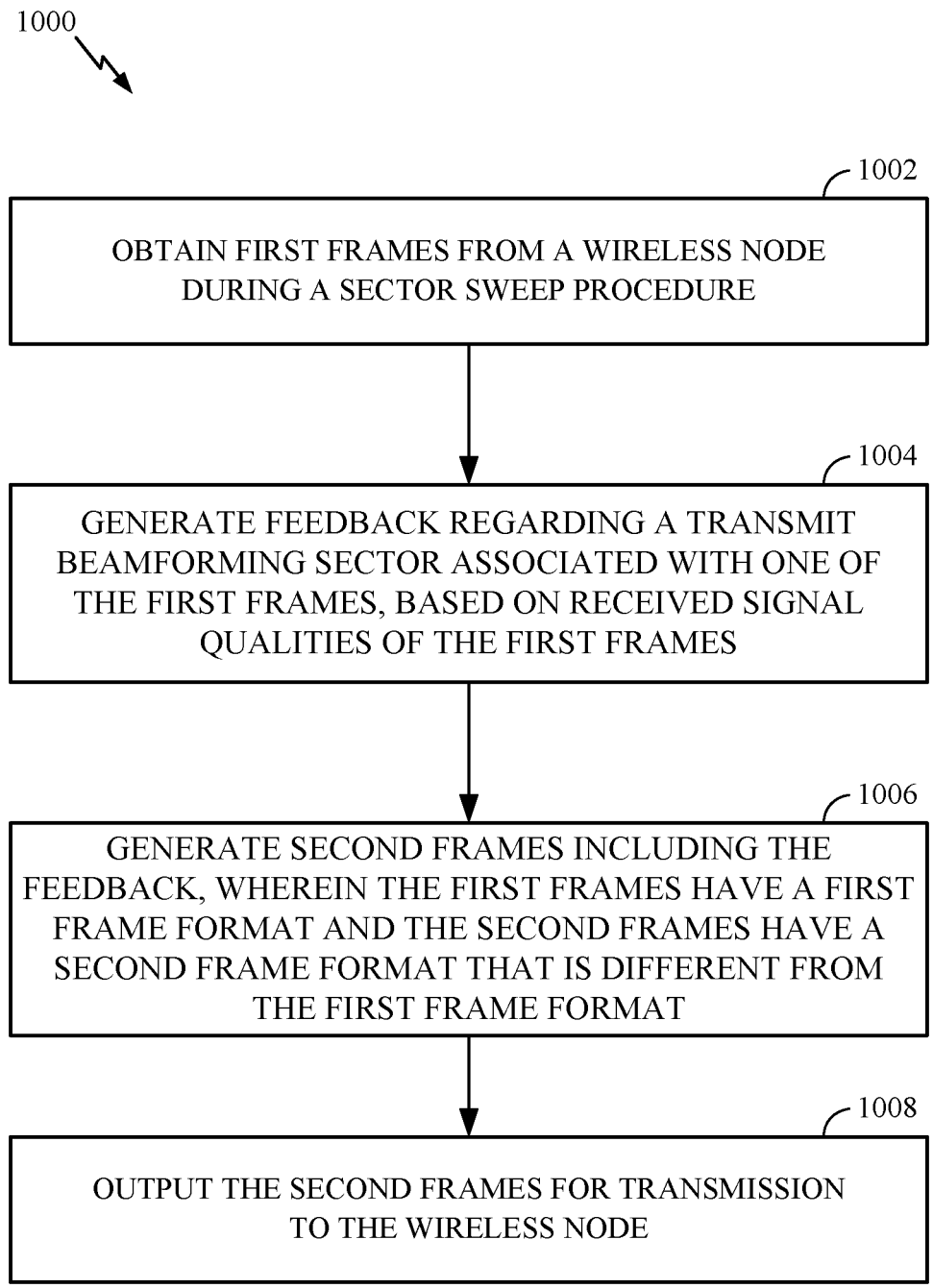
FIG. 10 illustrates example operations that may be performed by an apparatus for generating frames during a sector sweep procedure, in accordance with certain aspects of the present disclosure.
Figure 10A:
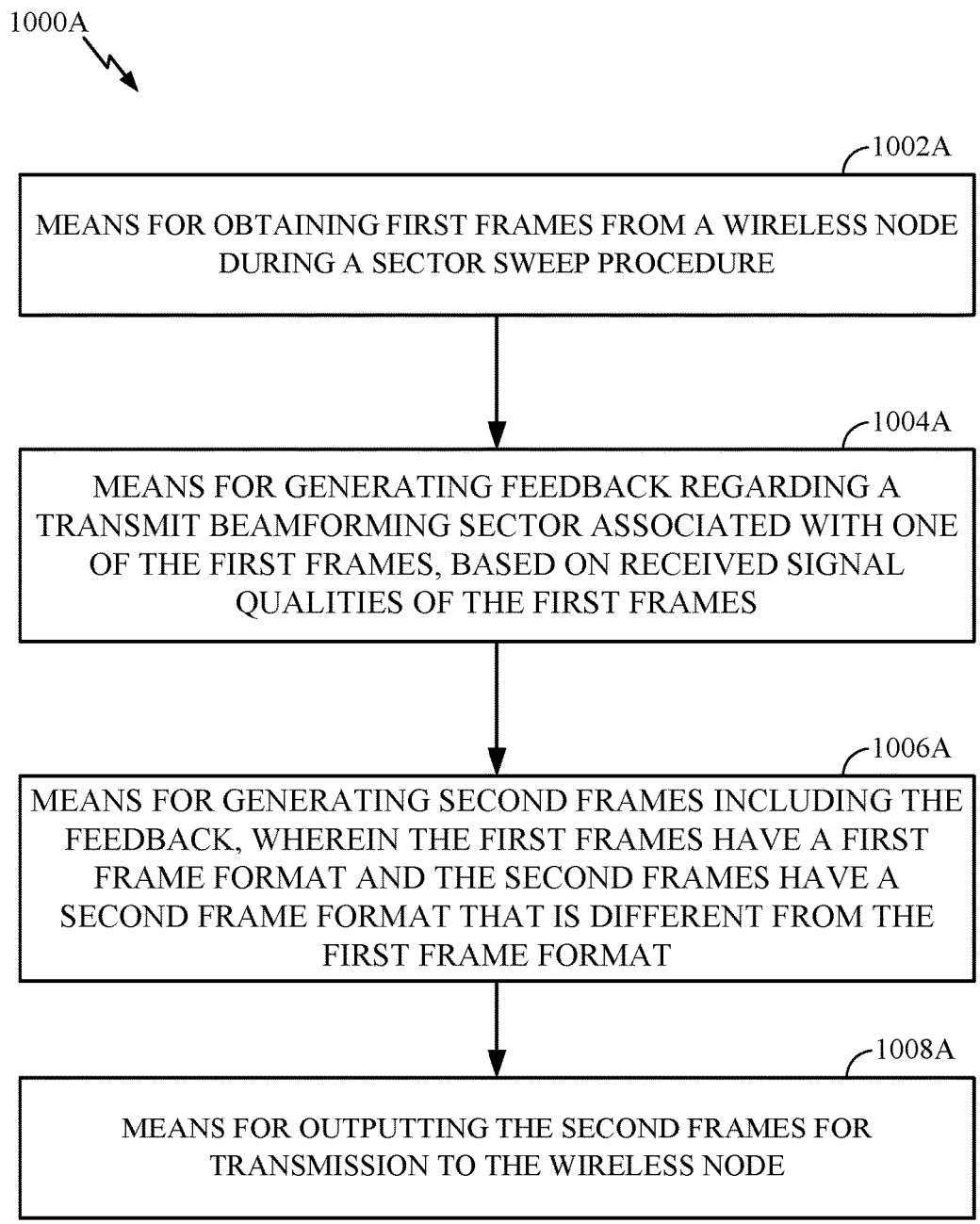
FIG. 10A illustrates components capable of performing the operations shown in FIG. 10, in accordance with certain aspects of the present disclosure.

FIG. 10 illustrates example operations 1000 that may be performed by an apparatus for generating response sector sweep frames using a compressed frame format during a sector sweep procedure, in accordance with certain aspects of the present disclosure.

The operations 1000 performed by the apparatus begin at 1002, by obtaining first frames from a wireless node during a sector sweep procedure. At 1004, the apparatus generates feedback regarding a transmit beamforming sector associated with one of the first frames, based on received signal qualities of the first frames as observed at the apparatus. At 1006, the apparatus generates second frames including the feedback, wherein the second frames have a different frame format than the first frames. At 1008, the apparatus outputs the second frames for transmission to the wireless node.

In some cases, the second frames may have a frame control field that has fewer bits than a control field of the first frames. For example, the responder frames may have a compressed frame control field that carries a new type definition (indicating the frame as a new type responder SSW frame). Bits removed from the frame control field may be used for SSW feedback information. A receiving device (e.g., the initiator) may detect the length of the frame (e.g., 6 bytes) and re-interpret bits of the frame control field, which act as (help the receiving device identify) a new frame type definition. In other words, the length of the frame assists in identifying the new frame type definition.

Figure 11:
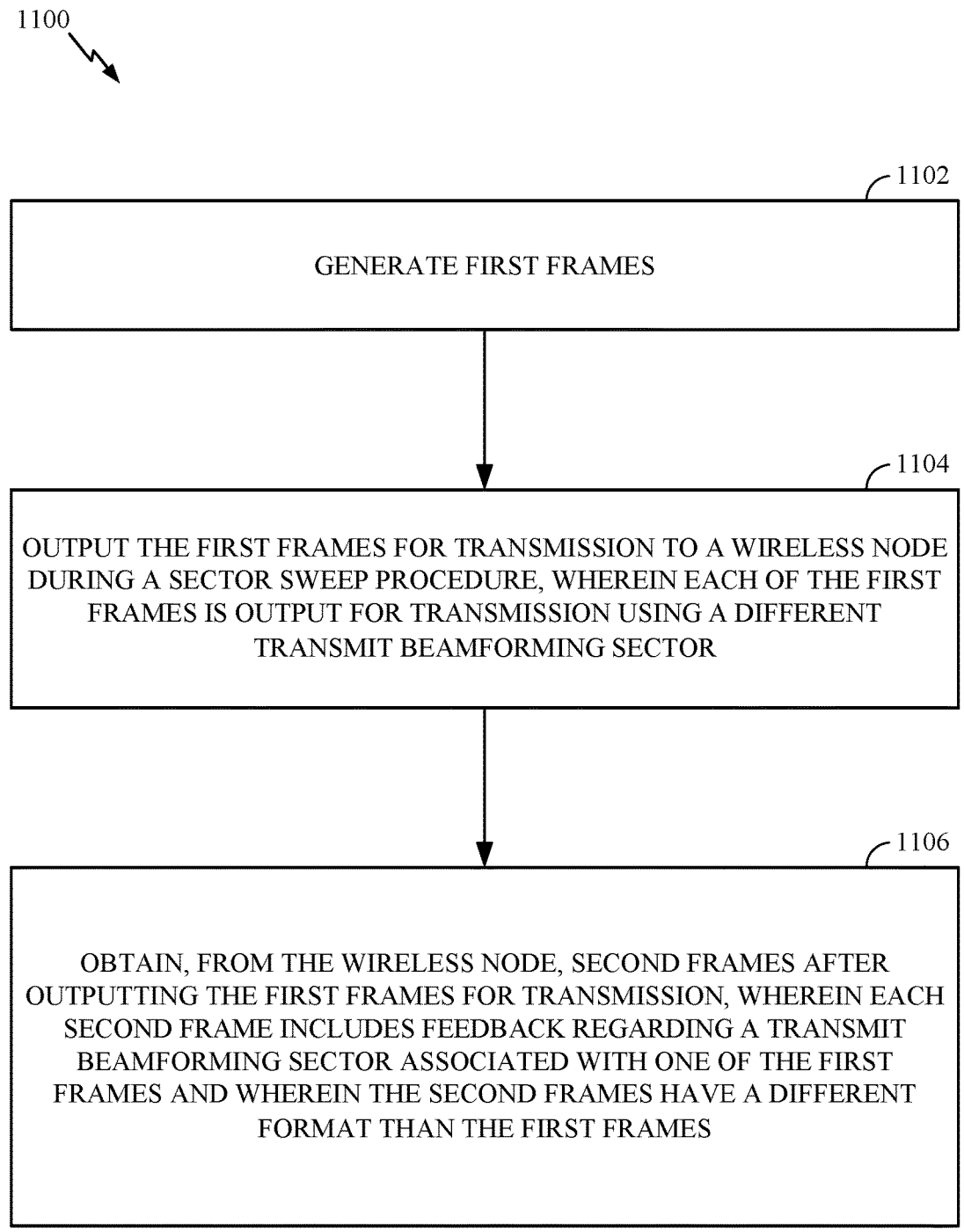
FIG. 11 illustrates example operation that may be performed by an apparatus for receiving frames during a sector sweep procedure, in accordance with certain aspects of the present disclosure.
Figure 11A:
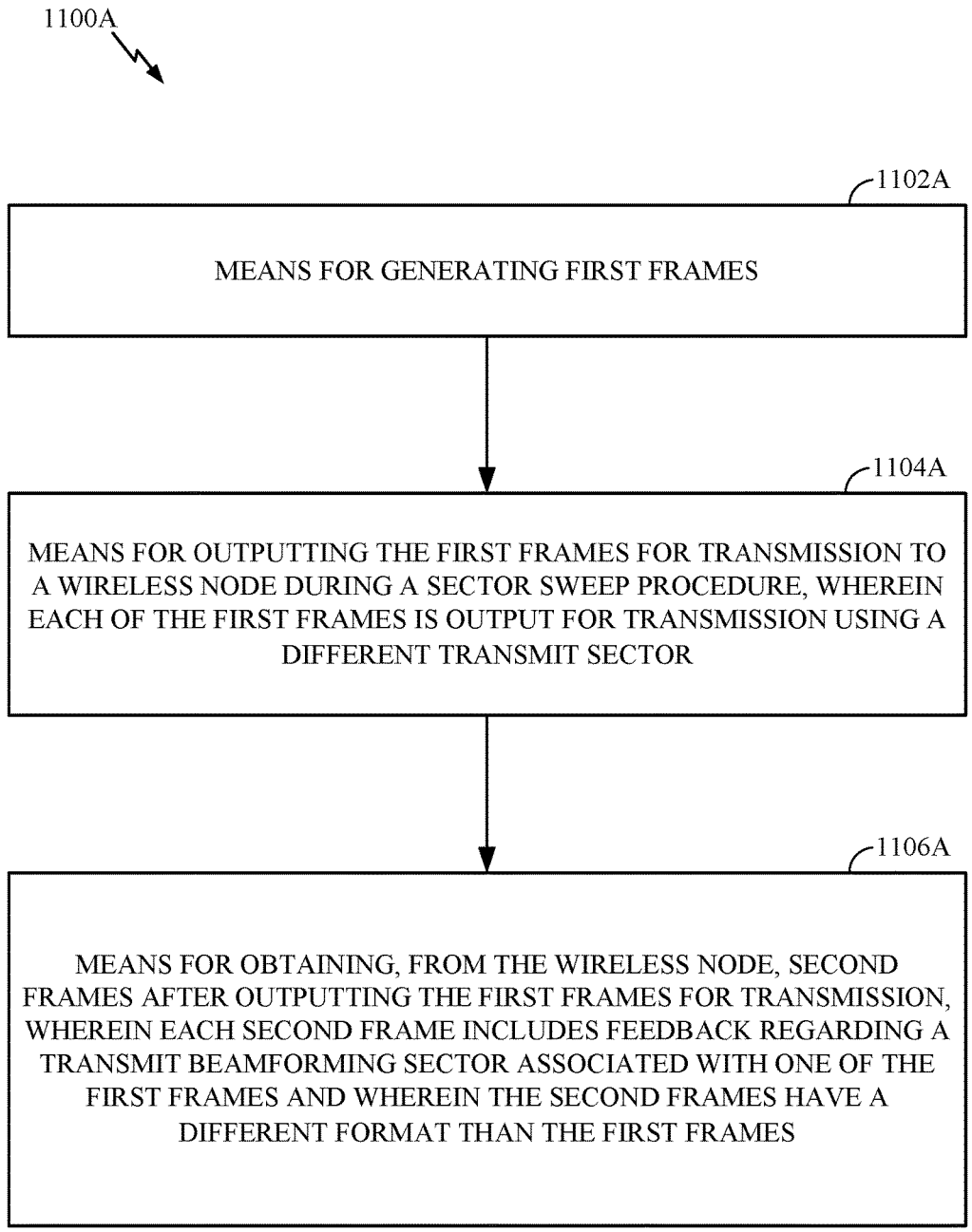
FIG. 11A illustrates components capable of performing the operations shown in FIG. 11, in accordance with certain aspects of the present disclosure.

FIG. 11 illustrates example operations 1100 that may be performed by an apparatus for processing compressed sectors sweep frames during a sector sweep procedure, in accordance with certain aspects of the present disclosure. In other words, operations 1100 may correspond to complementary operations performed by a station that is participating in beamforming training with a station generating compressed sector sweep frames according to operations 1000 described above.

The operations 1100 begin, at 1102, by generating first frames. At 1104, the apparatus outputs the first frames for transmission to a wireless node during a sector sweep procedure, wherein each of the first frames is output for transmission using a different transmit beamforming sector. At 1106, the apparatus obtains, from the wireless node, second frames after outputting the first frames for transmission, wherein each second frame includes feedback regarding a transmit beamforming sector associated with one of the first frames and wherein the second frames have a different format than the first frames. At 1108, the apparatus determines a transmit beamforming sector based on the feedbacks (and communicates with the wireless via the determined beamforming transmit sector). Depending on the scenario, the feedbacks could all be the same (e.g. indicating the same antenna and/or transmit beamforming sector) or different.

Figure 12A:
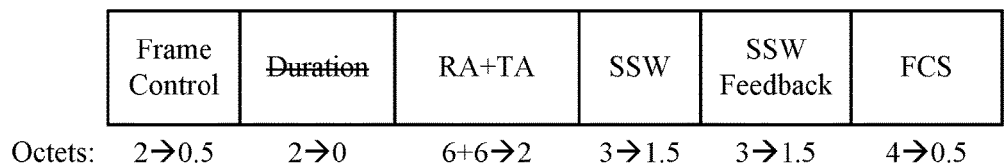
FIGS. 12A-12C illustrate examples of responder sector sweep frame formats, in accordance with certain aspects of the present disclosure.
Figure 12B:
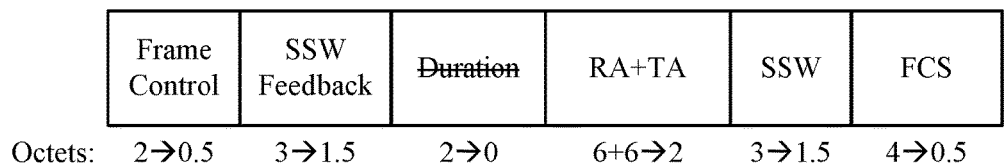
Figure 12C:
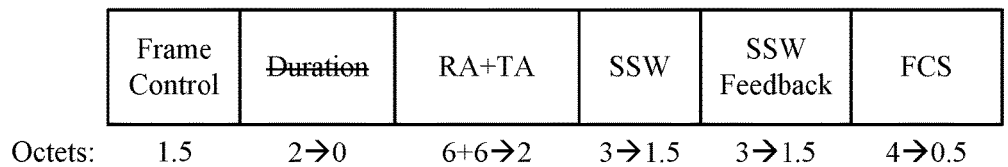

As noted above, aspects of the present disclosure provide a new frame-format for use by a sector sweep responder STA. As illustrated in FIGS. 12A-12C, in some cases, the new frame format may have a compressed frame control field, resulting in special frames of 6 bytes long for the responder SSW frames. As illustrated, other fields may also be compressed. For example, SSW feedback and SSW fields may be compressed from 3 bytes to 1.5 bytes, RA and TA fields may be compressed from 12 bytes to 2 bytes, while the FCS field may be compressed from 4 bytes to 0.5 bytes. As illustrated, a duration field may be compressed or removed (e.g., as the duration field may not be necessary due to defined timing of the responder sector sweep).

As illustrated in FIG. 12A, the 16 bits (2 bytes) of a conventional MAC control field may be compressed to a first 4 bits (0.5 bytes) of the frame MAC header to designate a new frame type field (e.g., serving as a new type definition). The next 12 bits (1.5 bytes) may be used as part of the frame body.

As illustrated in FIG. 12B, in some cases, these next 12 bits may be used by the sector sweep responder STA to indicate the SSW feedback (e.g., the best sector and antenna IDs determined based on the initiator SSW frames received during the initiator sector sweep portion of the sector sweep procedure).

As illustrated in FIG. 12C, in some cases, bits used for feedback (e.g., 12 bits) may be obtained by a combination of compressing the frame control field from 2 bytes to 1.5 bytes, yielding 4 bits compression, and further compressing the RA and TA fields (e.g., from 12 bytes to 1 byte rather than the 2 bytes shown in FIG. 12B), yielding another 8 bits of the 12 bits used for feedback.

Because there can be hundreds of sectors that may be swept during a responder sector sweep, the accumulative time reduction using the compressed responder SSW frame formats described herein can be significant and may result in significant performance improvements.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600, 700, 1000, and 1100 illustrated in FIGS. 6, 7, 10, and 11 correspond to means 600A, 700A, 1000A, and 1100A, illustrated in FIGS. 6A, 7A, 10A, and 11A.

For example, means for receiving may include a receiver (e.g., the receiver unit of a transceiver 222) and/or an antenna(s) 224 of the access point 110 illustrated in FIG. 2 or the receiver 312 and/or antenna(s) 316 depicted in FIG. 3. Means for processing, means for determining, or means for calculating include a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

In some cases, rather than actually transmitting a frame a device may have an interface to output a frame for transmission. For example, a processor may output (be configured for outputting) a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for generating frames for transmission during a sector sweep procedure.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" or "generation" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein may include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a first interface for obtaining first frames from a wireless node during a sector sweep procedure;
a processing system configured to generate feedback regarding a transmit beamforming sector associated with one of the first frames, based on received signal qualities of the first frames as observed at the apparatus, and to generate second frames including the feedback, wherein the first frames have a first frame format and the second frames have a second frame format that is different from the first frame format; and
a second interface configured to output the second frames for transmission to the wireless node, wherein the second frame format has a frame control field having fewer bits than a frame control field of the first frame format.

2. The apparatus of claim 1, wherein the frame control field of the second frame format has less than 8 bits.

3. The apparatus of claim 1, wherein generation of the second frames comprises generating an address field of each second frame, based on at least one of an address of the apparatus or an address of the wireless node, and further wherein the generated address field has fewer bits than an address field of the first frames.

4. The apparatus of claim 1, wherein each second frame lacks a duration field.

5. The apparatus of claim 1 further comprising:
a receiver configured to receive the first frames; and
a transmitter configured to transmit the second frames to the wireless node, wherein the apparatus is configured as a wireless station.

6. The apparatus of claim 1, wherein the frame control field having fewer bits than a frame control field of the first frame format.

7. The apparatus of claim 1, wherein each second frame lacks a duration field.

8. An apparatus for wireless communications, comprising:
a processing system configured to generate first frames;
a first interface configured to output the first frames for transmission to a wireless node during a sector sweep procedure, wherein each of the first frames is output for transmission using a different transmit beamforming sector; and
a second interface configured to obtain, from the wireless node, second frames after outputting the first frames for transmission, wherein each second frame includes feedback regarding a transmit beamforming sector associated with one of the first frames and wherein the second frames have a different format than the first frames;
wherein the processing system is further configured to determine a transmit beamforming sector based on the feedbacks and to communicate with the wireless via the determined beamforming transmit sector; and
wherein the processing system is further configured to:
identify a type of the second frames based, at least in part, on an overall length of the second frames; and
process the second frames based on the identification.

9. The apparatus of claim 8, wherein:
the second frames have an address field, generated based on at least one of an address of the apparatus or an address of the wireless node, that has fewer bits than an address field of the first frames; and
the processing system is configured to confirm the apparatus is an intended recipient of the second frames based on the address field.

10. The apparatus of claim 8, further comprising:
at least one antenna, wherein:
the first interface is configured to output the first frames for transmission via the at least one antenna;
the second interface is configured to obtain the second frames via the at least one antenna; and
the apparatus is configured as a wireless station.

11. An apparatus for wireless communications, comprising:
a first interface for obtaining first frames from a wireless node during a sector sweep procedure;
a processing system configured to generate feedback regarding a transmit beamforming sector associated with one of the first frames, based on received signal qualities of the first frames as observed at the apparatus, and to generate second frames including the feedback, wherein the first frames have a first frame format and the second frames have a second frame format that is different from the first frame format; and
a second interface configured to output the second frames for transmission to the wireless node, wherein a frame control field of the second frame format has less than 8 bits.

12. The apparatus of claim 11 further comprising at least one antenna via which the first frames are obtained and the second frames are outputted for transmission, wherein the apparatus is configured as a wireless station.

13. An apparatus for wireless communications, comprising:
a first interface for obtaining first frames from a wireless node during a sector sweep procedure;
a processing system configured to generate feedback regarding a transmit beamforming sector associated with one of the first frames, based on received signal qualities of the first frames as observed at the apparatus, and to generate second frames including the feedback, wherein the first frames have a first frame format and the second frames have a second frame format that is different from the first frame format; and
a second interface configured to output the second frames for transmission to the wireless node, wherein each second frame also includes a frame check sequence (FCS) comprising a length of less than or equal to one byte.

14. The apparatus of claim 13 further comprising at least one antenna via which the first frames are obtained and the second frames are outputted for transmission, wherein the apparatus is configured as a wireless station.

15. An apparatus for wireless communications, comprising:
a first interface for obtaining first frames from a wireless node during a sector sweep procedure;

a processing system configured to generate feedback regarding a transmit beamforming sector associated with one of the first frames, based on received signal qualities of the first frames as observed at the apparatus, and to generate second frames including the feedback, wherein the first frames have a first frame format and the second frames have a second frame format that is different from the first frame format; and a second interface configured to output the second frames for transmission to the wireless node, wherein each second frame lacks a duration field.

16. The apparatus of claim 15, wherein the second frame format has a frame control field having fewer bits than a frame control field of the first frame format.

17. The apparatus of claim 15, wherein a frame control field of the second frame format has less than 8 bits.

18. The apparatus of claim 15 further comprising at least one antenna via which the first frames are obtained and the second frames are outputted for transmission, wherein the apparatus is configured as a wireless station.

19. An apparatus for wireless communications, comprising:

a processing system configured to generate first frames;

a first interface configured to output the first frames for transmission to a wireless node during a sector sweep procedure, wherein each of the first frames is output for transmission using a different transmit beamforming sector; and a second interface configured to obtain, from the wireless node, second frames after outputting the first frames for transmission, wherein each second frame includes feedback regarding a transmit beamforming sector associated with one of the first frames and wherein the second frames have a different format than the first frames;

wherein the processing system is further configured to determine a transmit beamforming sector based on the feedbacks and to communicate with the wireless via the determined beamforming transmit sector; and wherein:

the second frames have a frame control field having fewer bits than a frame control field of the first frames; and the processing system is configured to identify a type of the second frames based, at least in part, on the bits in the frame control field and to process the second frames based on the identification.

20. The apparatus of claim 19 further comprising at least one antenna via which the first frames are outputted for transmission and the second frames are obtained, wherein the apparatus is configured as a wireless station.

21. An apparatus for wireless communications, comprising:

a processing system configured to generate first frames;

a first interface configured to output the first frames for transmission to a wireless node during a sector sweep procedure, wherein each of the first frames is output for transmission using a different transmit beamforming sector; and a second interface configured to obtain, from the wireless node, second frames after outputting the first frames for transmission, wherein each second frame includes feedback regarding a transmit beamforming sector associated with one of the first frames and wherein the second frames have a different format than the first frames;

wherein the processing system is further configured to determine a transmit beamforming sector based on the feedbacks and to communicate with the wireless via the determined beamforming transmit sector; and wherein:

the second frames have a frame control field having less than 8 bits; and the processing system is configured to identify a type of the second frames based, at least in part, on the bits in the frame control field.

22. The apparatus of claim 21 further comprising at least one antenna via which the first frames are outputted for transmission and the second frames are obtained, wherein the apparatus is configured as a wireless station.

* * * * *